United States Patent
Miyabe (10) Patent No.: US 8,837,532 B2
(45) Date of Patent: Sep. 16, 2014

(54) FRAME TRANSMISSION DEVICE AND SYNCHRONIZATION METHOD

(75) Inventor: Masatake Miyabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 57 days.

(21) Appl. No.: 13/600,990

(22) Filed: Aug. 31, 2012

(65) Prior Publication Data

US 2013/0121351 A1    May 16, 2013

(30) Foreign Application Priority Data

Nov. 14, 2011    (JP) .................................. 2011-248517

(51) Int. Cl.
*H04J 3/06*    (2006.01)
*H04L 12/26*    (2006.01)

(52) U.S. Cl.
CPC ............. *H04J 3/0667* (2013.01); *H04L 43/087* (2013.01); *H04L 43/106* (2013.01); *H04J 3/0697* (2013.01); *H04J 3/0682* (2013.01); *H04J 2203/006* (2013.01)
USPC .......................................... 370/516; 370/503

(58) Field of Classification Search
None
See application file for complete search history.

(56) References Cited

U.S. PATENT DOCUMENTS

| | | | |
|---|---|---|---|
| 2007/0147435 A1* | 6/2007 | Hamilton et al. | 370/503 |
| 2010/0054244 A1* | 3/2010 | Tamura | 370/389 |
| 2010/0118895 A1* | 5/2010 | Radulescu | 370/503 |
| 2010/0158183 A1* | 6/2010 | Hadzic et al. | 375/376 |
| 2010/0232316 A1* | 9/2010 | Takacs | 370/254 |
| 2010/0296406 A1* | 11/2010 | Rahbar | 370/252 |
| 2011/0122871 A1* | 5/2011 | Shenoi et al. | 370/389 |
| 2011/0158120 A1* | 6/2011 | Hamasaki et al. | 370/252 |
| 2011/0286560 A1* | 11/2011 | Pignatelli | 375/356 |
| 2013/0034197 A1* | 2/2013 | Aweya et al. | 375/362 |
| 2013/0259049 A1* | 10/2013 | Mizrahi | 370/392 |

FOREIGN PATENT DOCUMENTS

| | | |
|---|---|---|
| JP | 10-336182 | 12/1998 |
| JP | 2011-23788 | 2/2011 |

\* cited by examiner

*Primary Examiner* — Donald Mills
(74) *Attorney, Agent, or Firm* — Staas & Halsey LLP (57) ABSTRACT

A frame transmission device includes: a clock section; a path control section to switch a plurality of transmission paths for exchanging a time synchronization frame with a node device that measures a reference time; a fluctuation estimation section to set a fluctuation estimate of a transmission delay of the time synchronization frame on each of the plurality of transmission paths; and a time synchronization section to synchronize the clock section to the reference time in accordance with a time synchronization frame exchanged on a selected transmission path selected from among the plurality of transmission paths based on the fluctuation estimate.

12 Claims, 10 Drawing Sheets

FRAME TRANSMISSION DEVICE AND SYNCHRONIZATION METHOD

CROSS-REFERENCE TO RELATED APPLICATION

This application is based upon and claims the benefit of priority of the prior Japanese Patent Application No. 2011-248517, filed on Nov. 14, 2011, the entire contents of which are incorporated herein by reference.

FIELD

The embodiment discussed herein is related to a transmission device.

BACKGROUND

A method for time synchronization between transmission devices which transmit frames via a transmission network includes, for example, the precision time protocol (PTP) defined in the IEEE (The Institute of Electrical and Electronics Engineers, Inc.) 1588. In the precision time protocol, a time synchronization frame called a PTP message is exchanged between a transmission device and a master clock, thereby correcting an error between a clock on the transmission device side and a clock of the master clock.

The related art is disclosed in Japanese Laid-open Patent Publication No. 2011-23788 or 10-336182.

SUMMARY

According to one aspect of the embodiments, a frame transmission device includes: a clock section; a path control section to switch a plurality of transmission paths for exchanging a time synchronization frame with a node device that measures a reference time; a fluctuation estimation section to set a fluctuation estimate of a transmission delay of the time synchronization frame on each of the plurality of transmission paths; and a time synchronization section to synchronize the clock section to the reference time in accordance with a time synchronization frame exchanged on a selected transmission path selected from among the plurality of transmission paths based on the fluctuation estimate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

One example of existing time synchronization process is disclosed in the following. In a network synchronization process, a path jitter is calculated from the difference between a master counter value of a synchronization packet and a slave counter value. Among a plurality of stored path jitters including a most recent one, a minimum path jitter is extracted. A predicted path jitter is formed from the difference between a path jitter and the minimum path jitter. A corrected slave counter value is calculated by adding the predicted path jitter to a slave counter value. A plurality of corrected slave counter values including a most recent one are stored. A plurality of master counter values of synchronization packets including a most recent one are stored. Based on a ratio of the difference between two stored corrected slave counter values and the difference between two corresponding master counter values, a frequency deviation is calculated to perform network synchronization.

Another example of existing time synchronization process is disclosed in the following. In an asynchronous transfer mode (ATM) network, a plurality of ATM nodes are provided. A master station includes a cell generation section which generates a time transfer cell and a cell insertion section which inserts the time transfer cell to a transmission path at a time-correction time. A slave station includes a cell extraction section which extracts a time transfer cell from a multiplexed cell taken from the transmission path and a setting section which sets a time at which the extracted time transfer cell is received, as a reference time for the slave station.

<Network Configuration>

Figure 1:
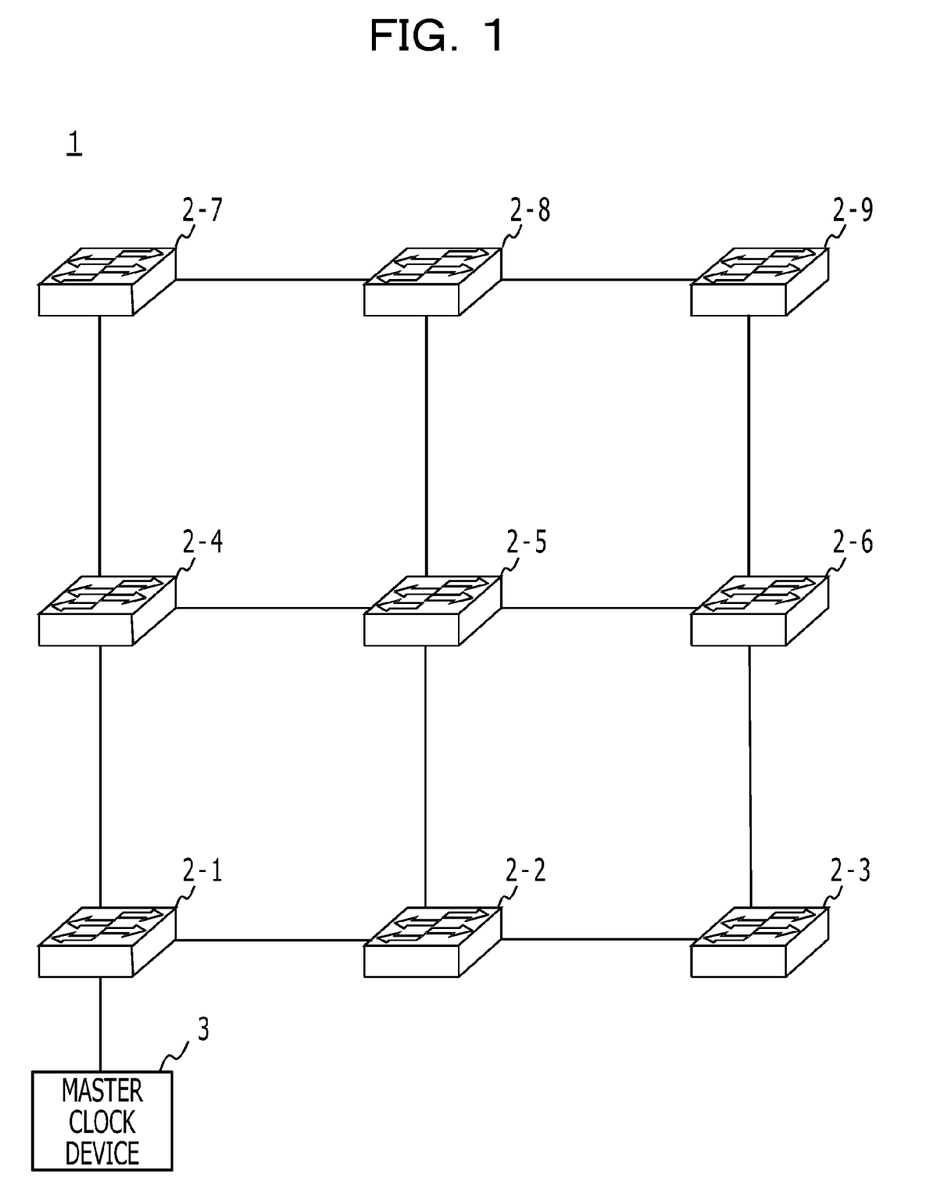
FIG. 1 illustrates an exemplary transmission network.

FIG. 1 illustrates an exemplary transmission network. The transmission network 1 includes a plurality of transmission devices 2-1 to 2-9 which transmit frames and a master clock device 3 which is coupled to the transmission device 2-1. The transmission device 2-1 is coupled to the transmission devices 2-2 and 2-4, the transmission device 2-2 is coupled to the transmission devices 2-1, 2-3, and 2-5, and the transmission device 2-3 is coupled to the transmission devices 2-2 and 2-6. The transmission device 2-4 is coupled to the transmission devices 2-1, 2-5, and 2-7, the transmission device 2-5 is coupled to the transmission devices 2-2, 2-4, 2-6, and 2-8, and the transmission device 2-6 is coupled to the transmission devices 2-3, 2-5, and 2-9. The transmission device 2-7 is coupled to the transmission devices 2-4 and 2-8, the transmission device 2-8 is coupled to the transmission devices 2-5, 2-7, and 2-9, and the transmission device 2-9 is coupled to the transmission devices 2-6 and 2-8. The transmission devices 2-1 to 2-9 may be collectively indicated as "transmission device 2."

The transmission device 2 transmits a time synchronization frame exchanged between an arbitrary transmission device 2 and the master clock device 3, on a path designated previously in the transmission network 1. When the transmission network 1 is an L2 (Layer 2) network, for example, an active topology in the MSTP (Multiple Spanning Tree Protocol) may be designated as a path for transmitting a time synchronization frame.

In the following explanation, a path for transmitting a time synchronization frame is designated by the active topology of the MSTP. However, this invention is not limited to the transmission network with MSTP active topology. This invention may be applied equally to the transmission network which can provide multiple paths for time synchronization messages between master clock device and any transmission device.

<Transmission Device>

Figure 2:
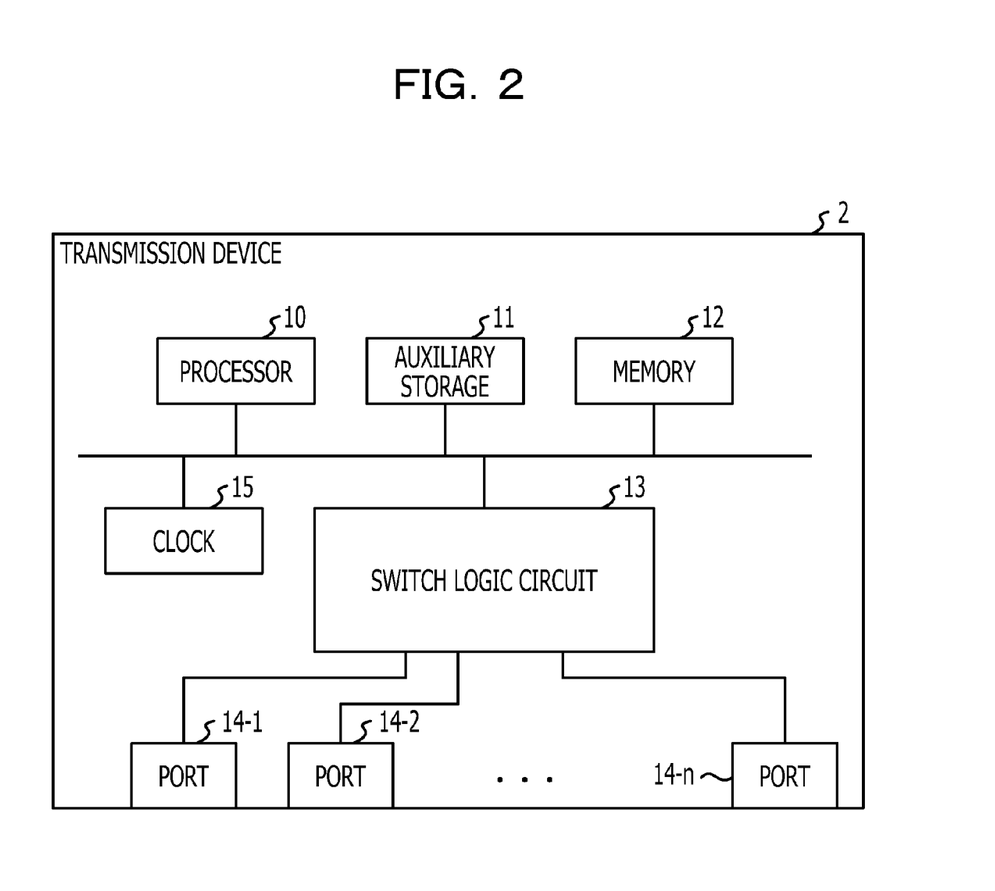
FIG. 2 illustrates an exemplary hardware configuration of a transmission device.

FIG. 2 illustrates an exemplary hardware configuration of a transmission device. The transmission device 2 includes a processor 10, an auxiliary storage 11, a memory 12, a switch logic circuit 13, ports 14-1 to 14-n, and a clock 15. Another hardware configuration may be used for the transmission device.

The processor 10 performs control of operation of the transmission device 2, a process of measuring a transmission delay of a frame, and a process of synchronizing the clock 15. In the auxiliary storage 11, a control program for causing the processor 10 to execute a process is stored. The auxiliary storage 11 includes a nonvolatile storage for storing a computer program. The nonvolatile storage includes, for example, a read only memory (ROM), a flash memory, or a hard disk. In the memory 12, temporary data and data used when the processor 10 executes the control program are stored. The memory 12 may include a random access memory (RAM).

The switch logic circuit 13 performs a switching frames transmitted and received through the ports 14-1 to 14-n in accordance with a communications protocol. The switch logic circuit 13 may be, for example, a large scale integration (LSI), an application specific integrated circuit (ASIC), a field-programming gate array (FPGA), or the like.

Figure 3:
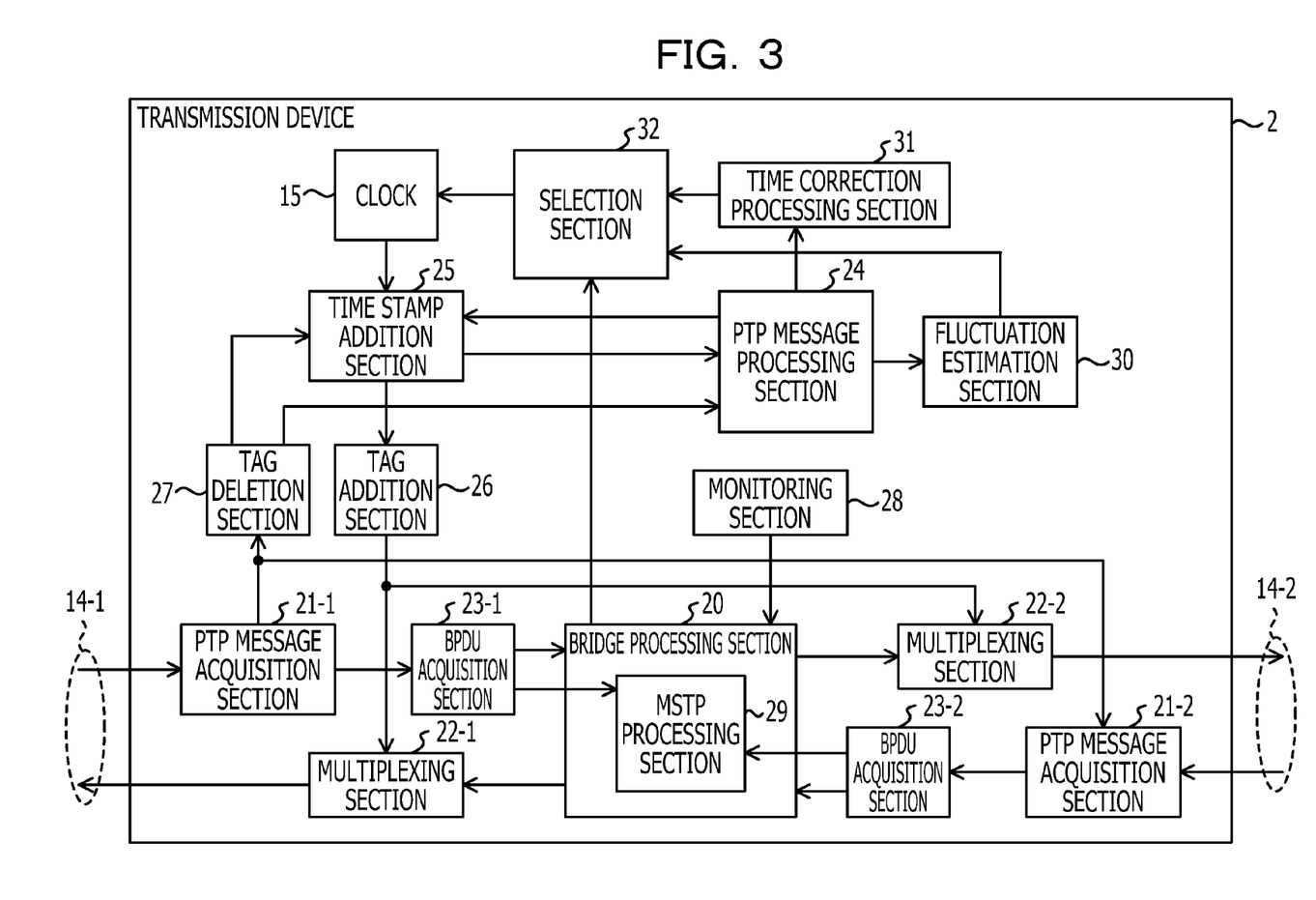
FIG. 3 illustrates an exemplary functional block of a transmission device.

FIG. 3 illustrates an exemplary functional block of a transmission device. The transmission device 2 may include other elements other than the elements illustrated in the drawing.

The transmission device 2 includes a clock 15, a bridge processing section 20, PTP message acquisition sections 21-1 and 21-2, multiplexing sections 22-1 and 22-2, and bridge protocol data unit acquisition sections 23-1 and 23-2. The transmission device 2 includes a PTP message processing section 24, a time stamp addition section 25, a tag addition section 26, a tag deletion section 27, and a monitoring section 28. The transmission device 2 includes a fluctuation estimation section 30, a time correction processing section 31, and a selection section 32. Bridge protocol data unit may be indicated as BPDU.

Processes of the bridge processing section 20, the PTP message acquisition sections 21-1 and 21-2, the multiplexing sections 22-1 an 22-2, and the BPDU acquisition sections 23-1 and 23-2 may be executed by the switch logic circuit 13 illustrated in FIG. 2. Processes of the PTP message processing section 24, the time stamp addition section 25, the tag addition section 26, the tag deletion section 27, and the monitoring section 28 may be executed by the switch logic circuit 13. Processes of the fluctuation estimation section 30, the time correction processing section 31, and the selection section 32 may be executed by the processor 10.

The bridge processing section 20 relays frames transmitted and received through the ports 14-1 to 14-n in accordance with the MSTP. For example, the bridge processing section 20 relays frames complying with IEEE802.1Q. The bridge processing section 20 includes an MSTP processing section 29 which executes a signal process complying with the MSTP. The PTP message acquisition section 21-1 acquires a PTP message from among frames received through the port 14-1, and outputs the PTP message to the tag deletion section 27. The PTP message may be a time synchronization frame exchanged between the transmission device 2 and the master clock device 3 for estimating a transmission delay of a frame between the transmission device 2 and the master clock device 3. The multiplexing section 22-1 multiplexes a PTP message to which a virtual local area network (VLAN) tag is added by the tag addition section 26, into a frame to be transmitted from the port 14-1. The BPDU acquisition section 23-1 acquires a BPDU from among the frames received through the port 14-1 and notifies the MSTP processing section 29 of the BPDU.

The PTP message acquisition section 21-2 acquires a PTP message from among frames received through the port 14-2 and outputs the PTP message to the tag deletion section 27. The multiplexing section 22-2 multiplexes a PTP message to which a VLAN tag is added by the tag addition section 26, into a frame to be transmitted from the port 14-2. The BPDU acquisition section 23-2 acquires a BPDU from among the frames received through the port 14-2 and notifies the MSTP processing section 29 of the BPDU. For the other ports 14-3 to 14-n as well, similar PTP message acquisition sections, multiplexing sections, and BPDU acquisition sections may be provided. The ports 14-1 to 14-n and the PTP message acquisition sections 21-1 and 21-2 may be collectively indicated as "port 14" and "PTP message acquisition section 21", respectively. The multiplexing sections 22-1 and 22-2 and the BPDU acquisition sections 23-1 and 23-2 may be collectively indicated as "multiplexing section 22" and "BPDU acquisition section 23", respectively.

The PTP message processing section 24 exchanges a PTP message with the master clock device 3 in accordance with a predetermined time synchronization protocol. For example, the time synchronization protocol may be the precision time protocol (PTP) defined in the IEEE 1588.

In the transmission network 1, a plurality of different active topologies are defined for transmitting a PTP message between the transmission device 2 and the master clock device 3. The MSTP processing section 29 calculates different active topologies for each multiple spanning tree (MST) instance in accordance with settings of a maintenance person of the transmission network 1. The MSTP processing section 29 associates at least one different MST instance with each VLAN.

Figure 4A:
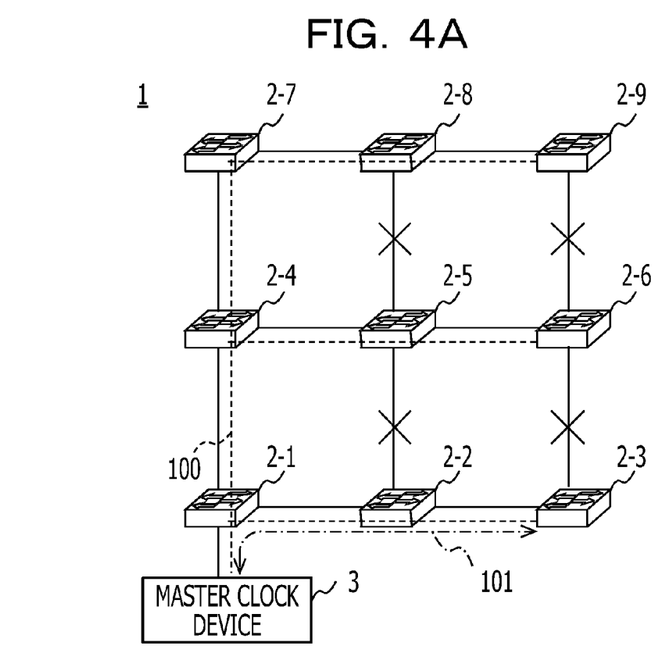
FIGS. 4A and 4B each illustrate an exemplary active topology.

FIGS. 4A and 4B each illustrate an exemplary active topology. An active topology may be set within the transmission network 1. As illustrated in FIG. 4A, a VLAN active topology blocks the port coupling between the transmission devices 2-2 and 2-5, the port coupling between the transmission devices 2-3 and 2-6, the port coupling between the transmission devices 2-5 and 2-8, and the port coupling between the transmission devices 2-6 and 2-9. The shape of the active topology is indicated by a dotted line 100. A transmission path for a PTP message may be, for example, a path indicated by an alternate long and short dash line 101.

Figure 4B:
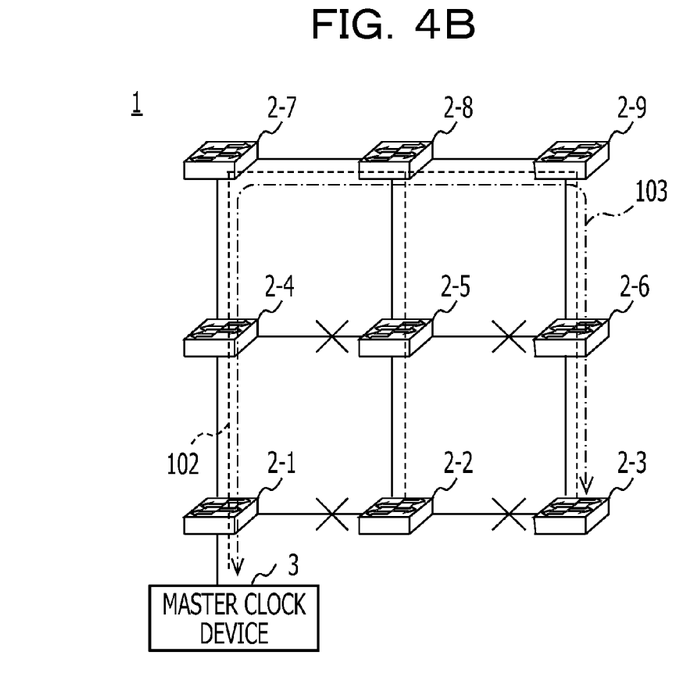

As illustrated in FIG. 4B, another VLAN active topology blocks the port coupling between the transmission devices 2-1 and 2-2, the port coupling between the transmission devices 2-2 and 2-3, the port coupling between the transmission devices 2-4 and 2-5, and the port coupling between the transmission devices 2-5 and 2-6. The shape of the other active topology is indicated by a dotted line 102. A transmission path for a PTP message may be, for example, a path indicated by an alternate long and short dash line 103. When an MST instance for different active topologies is associated with each VLAN, a PTP message may be transmitted via a plurality of different paths.

The PTP message processing section 24 illustrated in FIG. 3 performs a exchanging a PTP message with the master clock device 3 for each of a plurality of VLANs via which the PTP message is to be transmitted. The time stamp addition section 25 adds a time stamp to a PTP message received from the master clock device 3 and inputs the PTP message into the PTP message processing section 24. The time stamp addition section 25 adds a time stamp to a PTP message outputted from the PTP message processing section 24 and inputs the PTP message into the tag addition section 26. The time of a time stamp added by the time stamp addition section 25 is determined based on a time measured by the clock 15.

The tag addition section 26 adds, to a PTP message to which a time stamp is added by the time stamp addition section 25, a VLAN tag including a VLAN number corresponding to a VLAN through which the PTP message is transmitted, and outputs the PTP message to the multiplexing section 22. Since an active topology through which a PTP message is transmitted is switched based on a VLAN number, the tag addition section 26 may be a path control section which switches a path through which a PTP message is transmitted, between a plurality of paths.

The tag deletion section 27 deletes a VLAN tag from a PTP message acquired by the PTP message acquisition section 21-1 and inputs the PTP message into the time stamp addition section 25. The tag deletion section 27 informs the PTP message processing section 24 of the VLAN through which the PTP message is transmitted, by notifying the VLAN number designated in the VLAN tag.

The monitoring section 28 detects presence or absence of a failure of a link coupled to the transmission device 2. Upon detecting failure occurrence and recovery of the link, the monitoring section 28 notifies the MSTP processing section 29 of the occurred failure and the recovery. The MSTP processing section 29 transmits, to another transmission device 2, a message which notifies active topology change caused by the occurred failure and the recovery and designates an MST instance for which the active topology is changed. The message may be, for example, a BPDU in which a topology change flag defined in IEEE 802.Q is set. The MSTP processing section 29 of the transmission device 2 transmits a received BPDU to the adjacent transmission devices 2, and thus the BPDU notifying the active topology change caused by the occurred failure and the recovery is transmitted to all the transmission devices 2 in the transmission network.

The fluctuation estimation section 30 estimates fluctuation of a transmission delay of a PTP message transmitted on each VLAN, for each VLAN through which the PTP message is transmitted. The time correction processing section 31 calculates a difference between the clock of the master clock device 3 and the clock 15 based on a received PTP message and determines a correction amount for the clock 15.

Figure 5:
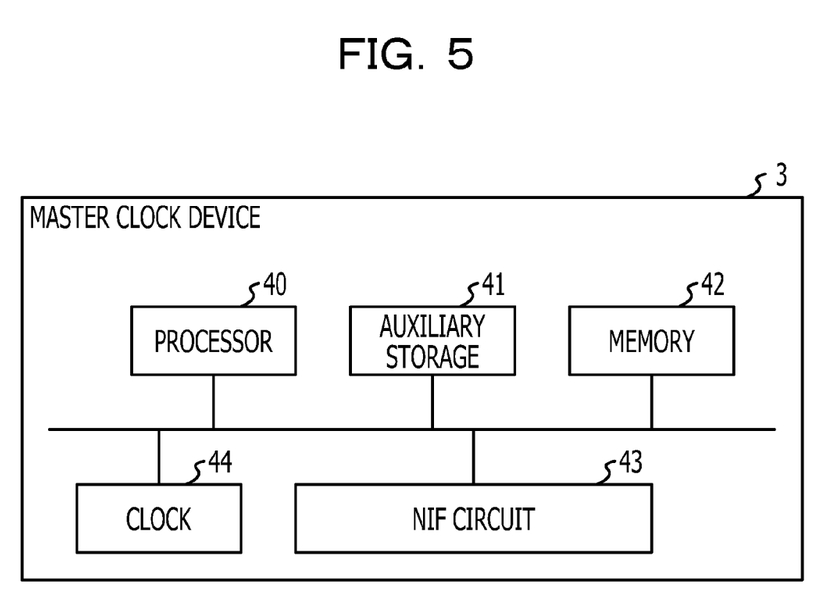
FIG. 5 illustrates an exemplary hardware configuration of a master clock device.

The selection section 32 selects a correction amount determined based on a PTP message which is transmitted via a VLAN having the smallest transmission delay fluctuation among a plurality of VLANs. The selection section 32 corrects the time of the clock 15 with the selected correction amount to synchronize the clock 15 with the clock of the master clock device 3. The selection section 32 may correspond to a time synchronization section which synchronizes the clock 15 to a reference time kept by the master clock device 3. FIG. 5 illustrates an exemplary hardware configuration of a master clock device. FIG. 5 illustrates the hardware configuration of the master clock device 3. The master clock device 3 includes a processor 40, an auxiliary storage 41, a memory 42, a network interface circuit 43, and a clock 44. Network interface may be indicated as "NIF". The master clock device 3 may have another hardware configuration.

The processor 40 performs a process of synchronizing the clock 15 of the transmission device 2 within the transmission network 1. In the auxiliary storage 41, a synchronization process program for causing the processor 40 to perform the process is stored. The auxiliary storage 41 includes a nonvolatile storage for storing a computer program. The nonvolatile storage may include, for example, a read only memory, a flash memory, or a hard disk. In the memory 42, temporary data and data used when the processor 40 executes the synchronization process program are stored. The memory 42 may include a random access memory.

The network interface circuit 43 performs processes of transmitting and receiving frames via the transmission network 1. The clock 44 keeps a reference time for synchronizing the clock 15 of the transmission device 2 within the transmission network 1.

Figure 6:
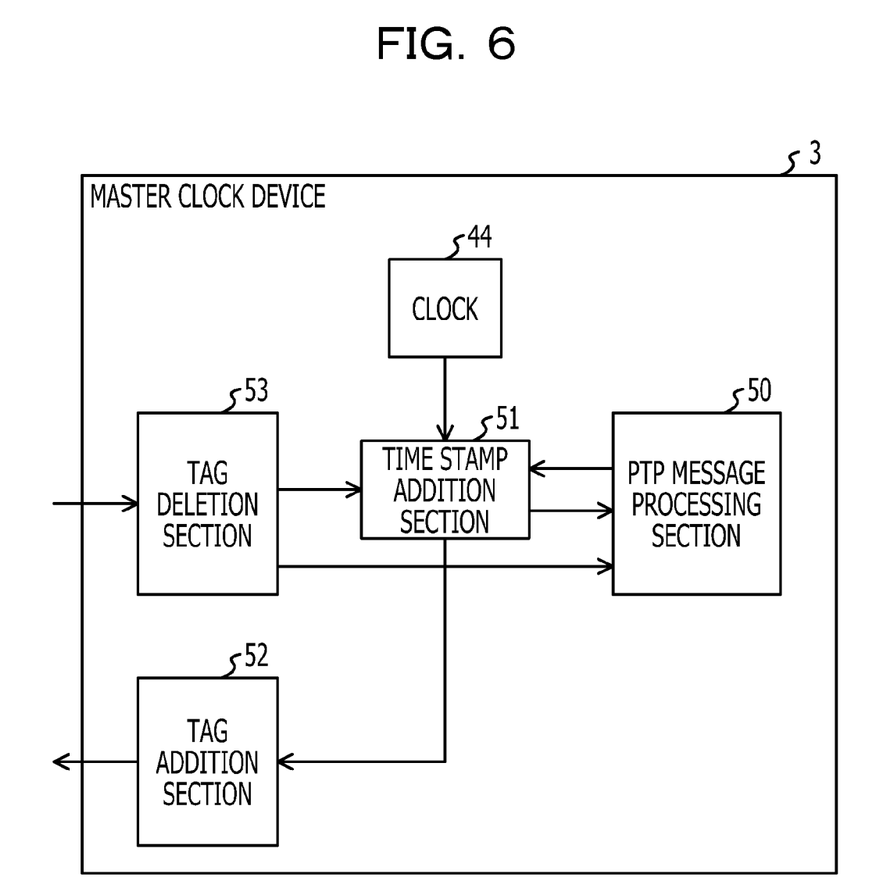
FIG. 6 illustrates an exemplary functional block of a master clock device.

FIG. 6 illustrates an exemplary function block of a master clock device. The master clock device 3 illustrated in FIG. 6 may include other elements other than the elements illustrated in the drawing.

The master clock device 3 includes a clock 44, a PTP message processing section 50, a time stamp addition section 51, a tag addition section 52, and a tag deletion section 53. Processes of the PTP message processing section 50, the time stamp addition section 51, the tag addition section 52, and the tag deletion section 53 are executed by the processor 40 illustrated in FIG. 5.

The PTP message processing section 50 exchanges a PTP message with the transmission device 2 for each of a plurality of VLANs through which the PTP message is transmitted. The time stamp addition section 51 adds a time stamp to a PTP message received from the transmission device 2 and inputs the PTP message into the PTP message processing section 50. The time stamp addition section 51 adds a time stamp to a PTP message output from the PTP message processing section 50 and inputs the PTP message into the tag addition section 52. The time of a time stamp added by the time stamp addition section 51 is determined based on a time measured by the clock 44.

The tag addition section 52 adds, to a PTP message to which a time stamp is added by the time stamp addition section 51, a VLAN tag including a VLAN number corresponding to a VLAN through which the PTP message is transmitted, and transmits the PTP message. The tag deletion section 53 deletes a VLAN tag from a PTP message received from the transmission device 2 and inputs the PTP message into the time stamp addition section 51. The tag deletion section 53 informs the PTP message processing section 50 of the VLAN through which the PTP message is transmitted, by notifying the VLAN number designated in the VLAN tag.

Figure 7:
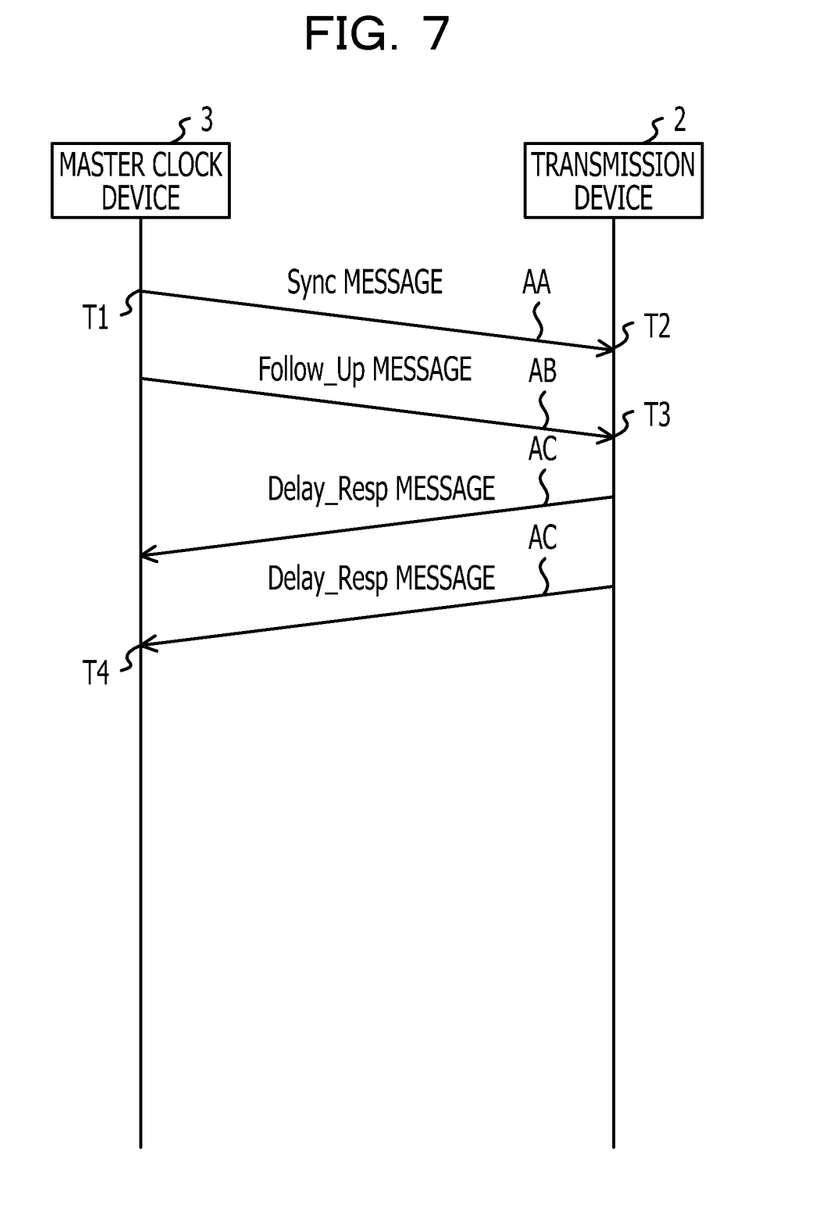
FIG. 7 illustrates an exemplary time synchronization process.

The transmission device 2 and the master clock device 3 synchronize the clock 15 of the transmission device 2 with the clock 44 of the master clock device 3 in accordance with the PTP. FIG. 7 illustrates an exemplary time synchronization process. A series of processes illustrated in FIG. 8 may include a plurality of procedures.

At operation AA, the PTP message processing section 50 of the master clock device 3 transmits a PTP message called Sync to the transmission device 2 and stores a transmission time T1 of the Sync message. At operation AB, the PTP message processing section 50 of the master clock device 3 notifies the transmission device 2 of T1 by using a PTP message called FollowUp.

In the transmission device 2, upon reception of the Sync message, the time stamp addition section 25 adds a time stamp of a reception time T2 to the Sync message and supplies the Sync message to the PTP message processing section 24. The PTP message processing section 24 stores the reception time T2. Upon reception of the FollowUp message, the PTP message processing section 24 extracts the value of T1 therefrom and stores the value.

At operation AC, the PTP message processing section 24 of the transmission device 2 transmits a PTP message called DelayReq to the master clock device 3 and stores a transmission time T3 thereof. In the master clock device 3, upon reception of the DelayReq message, the time stamp addition section 25 adds a time stamp of a reception time T4 to the DelayReq message and supplies the DelayReq message to the PTP message processing section 50. The PTP message processing section 50 stores the reception time T4. At operation AD, the PTP message processing section 50 notifies the transmission device 2 of the reception time T4 by using a PTP message called DelayResp.

The master clock device 3 and the transmission device 2 periodically exchange PTP messages therebetween and acquire T1 to T4. The time correction processing section 31 of the transmission device 2 starts a time correction algorithm and uses the values of T1 to T4 to determine a correction amount for synchronizing the clock 15 with the clock 44 of the master clock device 3. Based on T1 to T4, a transmission delay D between the master clock device 3 and the transmission device 2 is estimated as $((T4-T1)-(T3-T2))/2$. The time correction processing section 31 determines a correction amount for the clock 15 based on the transmission delay D and the difference between the time of the clock 15 and the time of the clock 44.

Figure 8:
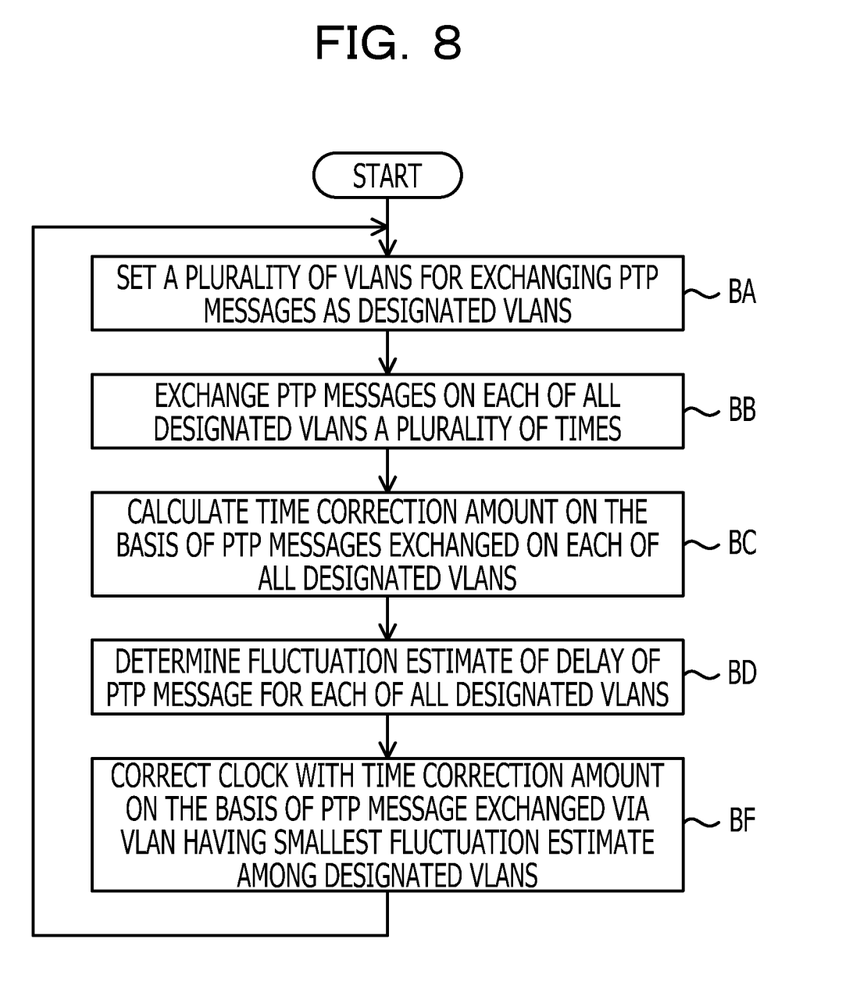
FIG. 8 illustrates an exemplary process of a transmission device.

FIG. 8 illustrates an exemplary process of the transmission device. At operation BA, a plurality of VLANs for exchanging PTP messages are set by the maintenance person of the transmission network 1. The MSTP processing section 29 calculates different active topologies for each MST instance associated with each VLAN in accordance with the settings of the maintenance person. The plurality of VLANs, which are set for exchanging PTP messages, may be indicated as "designated VLANs."

At operation BB, the PTP message processing section 24 of the transmission device 2 and the PTP message processing section 50 of the master clock device 3 exchange PTP messages on each of all the designated VLANs a plurality of times. At operation BC, the time correction processing section 31 calculates a correction amount for the clock 15 based on PTP messages exchanged on each designated VLAN.

At operation BD, the fluctuation estimation section 30 determines a fluctuation estimate of a transmission delay of a PTP message transmitted on each VLAN, for each designated VLAN. At operation BE, the selection section 32 selects a correction amount determined based on a PTP message that is transmitted via a VLAN having the smallest transmission delay fluctuation among the plurality of VLANs. The selection section 32 corrects the time of the clock 15 with the selected correction amount to synchronize the clock 15 with the clock of the master clock device 3. The processing returns to operation BA.

Figure 9:
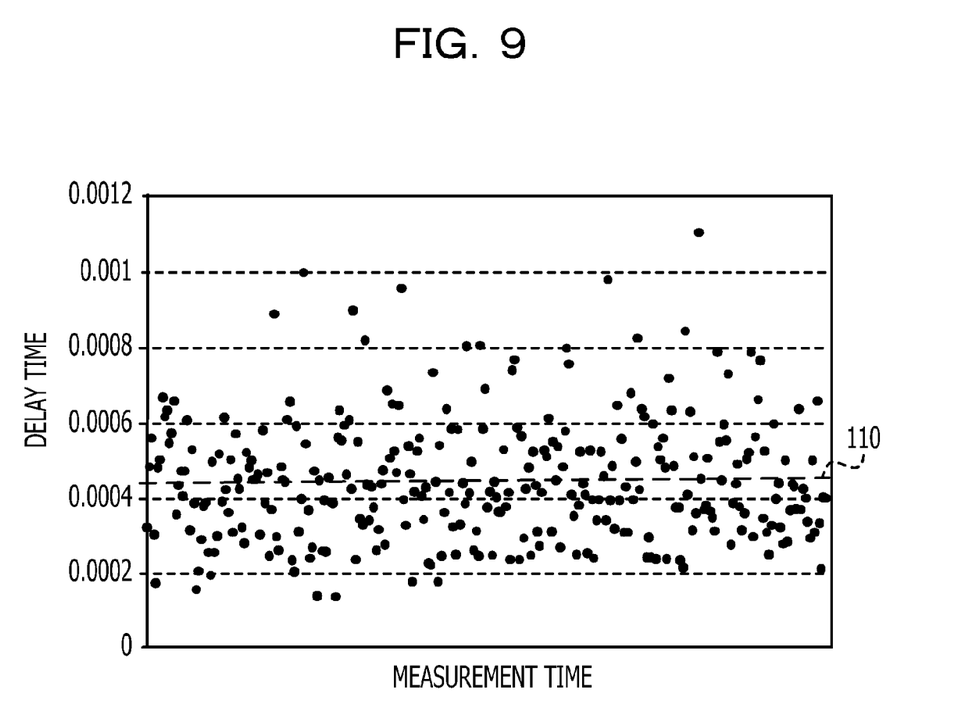
FIG. 9 illustrates an exemplary delay time.

Since PTP messages are periodically and repeatedly exchanged, the transmission time of the Sync message for the ith time may be indicated as $T1(i)$, and the reception time of the Sync message may be indicated as $T2(i)$. The transmission time of the DelayReq message for the ith time may be indicated as $T3(i)$, and the reception time of the DelayReq message may be indicated as $T4(i)$. FIG. 9 illustrates an exemplary delay time. The Y axis illustrated in FIG. 9 indicates a delay time $(T2(i)-T1(i))$, and the X axis indicates a measurement time of the delay time. As the measurement time, a variable "i" or $T1(i)$ may be used. The fluctuation estimation section 30 performs linear approximation of a function of the delay time and the measurement time. A dotted line 110 indicates a linear approximate line of the relationship between the delay time and the measurement time.

The fluctuation estimation section 30 calculates an approximation error between the linear approximate line 110 and an observed delay time $(T2(i)-T1(i))$. The approximation error may be, for example, the absolute value or square of the difference between the first-order approximate straight line 110 and the delay time. The fluctuation estimation section 30 sets the average of approximation errors during a predetermined period as an estimate of delay fluctuation for a Sync message. The fluctuation estimation section 30 similarly calculates an estimate of delay fluctuation for a DelayReq message and outputs these two averages.

The average of delay times of PTP messages varies according to a frequency deviation between the clock 15 of the transmission device 2 and the clock 44 of the master clock device 3. Thus, the average of delay times measured during a measurement period of delay fluctuation includes the frequency deviation component. Since a delay fluctuation is calculated based on an approximation error of the measurement value of the delay time with respect to the linear approximate line, the influence of the frequency deviation may be excluded from the calculation of the delay fluctuation.

Since a correction amount for the clock of the transmission device 2 is determined based on a time synchronization frame exchanged via a path having a small delay fluctuation, high-accuracy time synchronization may be achieved.

When the transmission device 2 receives a message that designates an MST instance in which an active topology is changed, the MSTP processing section 29 notifies the selection section 32 of the changed active topology of the VLAN. The selection section 32 may not select a correction amount calculated based on a PTP message exchanged using the VLAN of which the topology change is notified of, as a correction amount for correcting the time of the clock 15 during a given period after the topology change.

Figure 10:
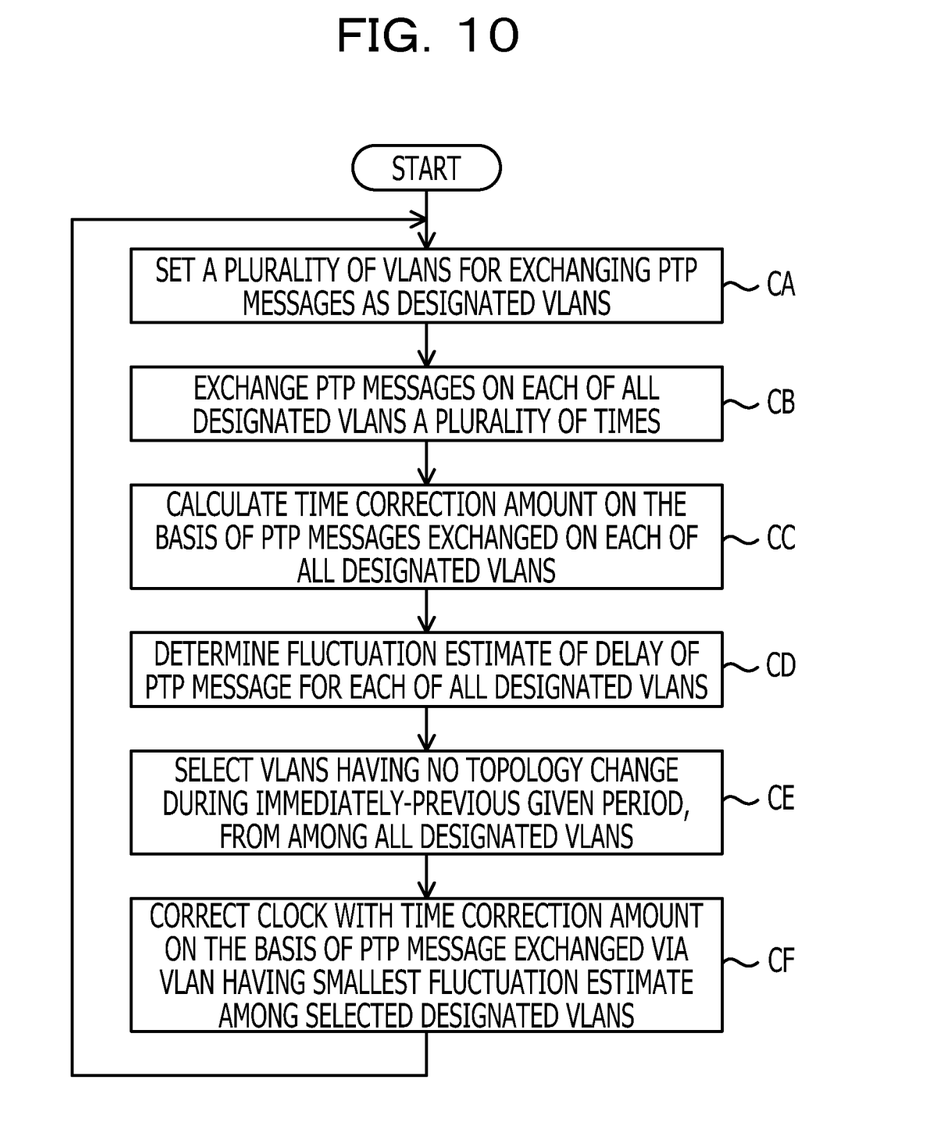
FIG. 10 illustrates an exemplary process of a transmission device.

FIG. 10 illustrates an exemplary process of a transmission device. Processes at operations CA to CD illustrated in FIG. 10 may be substantially the same as or similar to the processes at operations BA to BD illustrated in FIG. 8. At operation CE, the selection section 32 selects VLANs having no topology change during the immediately-previous given period, from among the designated VLANs. At operation CF, the selection section 32 selects a correction amount determined based on a PTP message that is transmitted via a VLAN having the smallest transmission delay fluctuation among the VLANs selected at operation CE. The selection section 32 corrects the time of the clock 15 with the selected correction amount. The processing returns to operation CA.

Since a correction amount for the clock of the transmission device 2 is determined based on a time synchronization frame exchanged on a VLAN having no topology change, high-accuracy time synchronization, for example, time synchronization that is unlikely to be influenced by a failure, may be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A frame transmission device comprising:
   a clock section;
   a path control section to switch a plurality of transmission paths between a node device and the frame transmission device to exchange, across each of the plurality of transmission paths, a time synchronization frame with the node device that measures a reference time, the plurality of transmission paths being different from each other;
   a fluctuation estimation section to set a fluctuation estimate of a transmission delay of the time synchronization frame on each of the plurality of transmission paths; and
   a time synchronization section to synchronize the clock section to the reference time in accordance with a time synchronization frame exchanged on a selected transmission path selected from among the plurality of transmission paths based on the fluctuation estimate of each of the plurality of transmission paths.

2. The frame transmission device according to claim 1, further comprising,
   a topology change detection section to detect a topology change in the plurality of transmission paths.

3. The frame transmission device according to claim 2, wherein, when a topology change occurs in at least one of the plurality of transmission paths, the time synchronization section performs synchronization of the clock section in accordance with a time synchronization frame exchanged on a transmission path other than the at least one of the plurality of transmission paths.

4. The frame transmission device according to claim 1, wherein the fluctuation estimation section sets the fluctuation estimate in accordance with an approximation error of first-order approximation of a relationship between a time at which the time synchronization frame is exchanged and a delay time of the time synchronization frame.

5. The frame transmission device according to claim 1, wherein
   the plurality of transmission paths correspond to a plurality of virtual local area networks within a transmission network, and
   the path control section switches a virtual local area network through which the time synchronization frame is transmitted.

6. A synchronization method for a frame transmission device, comprising:
   switching a plurality of transmission paths between a node device and the frame transmission device to exchange, across each of the plurality of transmission paths, a time synchronization frame with the node device that measures a reference time, the plurality of transmission paths being different from each other;
   calculating a fluctuation estimate of a transmission delay of the time synchronization frame on each of the plurality of transmission paths; and
   synchronizing a clock of the frame transmission device to the reference time in accordance with a time synchronization frame exchanged on a selected transmission path selected from among the plurality of transmission paths based on the fluctuation estimate of each of the plurality of transmission paths.

7. The synchronization method according to claim 6, further comprising, detecting a topology change in the plurality of transmission paths.

8. The synchronization method according to claim 7, further comprising,
   when a topology change occurs in at least one of the plurality of transmission paths, performing a synchronization in accordance with a time synchronization frame exchanged on a transmission path other than at least one of the plurality of transmission paths.

9. The synchronization method according to claim 7, further comprising,
   setting the fluctuation estimate in accordance with an approximation error of first-order approximation of a relationship between a time at which the time synchronization frame is exchanged and a delay time of the time synchronization frame.

10. The frame transmission device according to claim 1, wherein the path control section switches the plurality of transmission paths by adding an identifier corresponding to each of the plurality of transmission paths to the time synchronization frame.

11. The synchronization method according to claim 6, further comprising,
    adding an identifier corresponding to each of the plurality of transmission paths to the time synchronization frame to switch the plurality of transmission paths.

12. A method comprising:
    switching a plurality of different transmission paths between a node device and a frame transmission device to exchange, across each of the plurality of different transmission paths, a time synchronization frame with the node device that measures a reference time;
    calculating a fluctuation estimate of a transmission delay of the time synchronization frame on each of the plurality of different transmission paths based on a relationship between a time at which the time synchronization frame is exchanged and a delay time corresponding with the time synchronization frame; and
    synchronizing a clock of the frame transmission device to the reference time in accordance with a time synchronization frame exchanged on a selected transmission path selected from among the plurality of different transmission paths based on the fluctuation estimate of each of the plurality of different transmission paths.

* * * * *